United States Patent [19]

Usami et al.

[11] 3,919,608
[45] Nov. 11, 1975

[54] SYSTEM FOR DRIVING A PULSE MOTOR

[75] Inventors: Hiroshi Usami; Katsuo Kohari, both of Yokohama; Hiroshi Ishida, Tokyo, all of Japan

[73] Assignees: Fujitsu Ltd.; Fujitsu Fanuc Limited, both of Tokyo, Japan

[22] Filed: July 22, 1974

[21] Appl. No.: 490,331

[30] Foreign Application Priority Data
July 26, 1973  Japan.................. 48-83601

[52] U.S. Cl............................. 318/138; 318/696
[51] Int. Cl.²........................................ H02K 29/00
[58] Field of Search............ 318/138, 254, 685, 696

[56] References Cited
UNITED STATES PATENTS

| | | |
|---|---|---|
| 3,626,269 | 12/1971 | Stanley ........................ 318/696 |
| 3,662,245 | 5/1972 | Newell ............................. 318/696 |
| 3,757,193 | 9/1973 | Inaba et al. ......................... 318/696 |

*Primary Examiner*—G. Z. Rubinson
*Attorney, Agent, or Firm*—Staas & Halsey

[57] ABSTRACT

The present invention relates to a driving system for a pulse motor which is supplied trapezoidal command signals so that the currents in the motor coils coincide with the trapezoidal waveform, wherein high voltage excitation pulses which are synchronized with the steps of the increasing staircase portions of the trapezoidal command signals are applied to the motor coils and pulse width of which sufficiently increases the current corresponding to each increment of the increasing staircase portion and thereafter excitation mode is switched to low voltage excitation from the high voltage excitation to supply a complete trapezoidal exciting current to the motor coils.

4 Claims, 8 Drawing Figures

SYSTEM FOR DRIVING A PULSE MOTOR

FIELD OF THE PRESENT INVENTION

The present invention relates to a system for driving a pulse motor, especially, as it relates to a system for driving a pulse motor which is driven by supplying trapezoidal waveform currents to the motor coils for the purpose of obtaining smooth revolution of the pulse motor.

The pulse motor is driven by precise synchronization with command pulses. Therefore, the pulse motor can constitute a high accuracy servo-system with open loops. However, stepwise revolution of the pulse motor renders use of the pulse motor undesirable in a finishing machine. That is, on the surface of the work which is finished by the finishing machine provided with said pulse motor, stripes appear due to the intermittent step rotations of said pulse motor. Therefore, the appearance of the finished surface of the work is spoiled.

Further, there is another defect, that is, vibration and noise generate due to the intermittent rotation and resonance between the driving frequency of the pulse motor and the finishing machine.

For the purpose of eliminating the above-mentioned drawbacks, it is known that the amount of step per one command pulse is decreased by increasing the number of teeth and the number of exciting phases of the pulse motor. However, the number of teeth and the number of exciting phases of the pulse motor have a limit in constraint to the construction, so that the appearance of the work cannot be improved beyond a certain limit.

Also for the purpose of eliminating the above-mentioned two drawbacks there is known a system for smoothly driving the electric pulse motor, wherein it is required to excite the electric pulse motor with an exciting control voltage which supplies a current having a trapezoidal waveform. For example, when, for the purpose of supplying currents having a trapezoidal waveform to motor coils provided in a pulse motor which steps 10 $\mu$ per one input pulse, a plurality of the motor coils are controlled so that the current in each motor coil is increased and decreased one coil after another, the rotor of the pulse motor displaces smoothly between poles because, the magnetically stable points displace continuously between poles. And in order to supply such currents having a trapezoidal waveform to the motor coils, the trapezoidal waveform command input signals are supplied to a linear amplifier, the motor coils are connected to the output of the linear amplifier and the currents in the motor coils are fed back to the input of the linear amplifier. However, in this system, the currents of the motor coils do not always have a trapezoidal waveform, because said current receives the affect of the inductance of the motor coils. This affect is more considerable, when the speed of the motor increases.

The object of the present invention is to provide a driving system for a pulse motor which overcomes the above-mentioned drawbacks and supplies currents having a precise trapezoidal waveform to the motor coils, smoothly drives the pulse motor and reduces vibration and noise.

Accordingly to the present invention, the above-mentioned object can be achieved by a system for driving a pulse motor which receives trapezoidal waveform command pulses and controls the currents in the motor coils so that they are coincident with the trapezoidal waveform. Said system applies to the motor coils high voltage excitation pulses, which are synchronized with the steps of the increasing staircase portions of the trapezoidal command signals and a pulse width of which sufficiently increases the current corresponding to each step of the increasing staircase portion and thereafter excitation mode high voltage is switched to low voltage from the high voltage excitation to supply complete trapezoidal pulse exciting current to the motor coils.

Further features and advantages of the present invention will be apparent from the ensuing description, with reference to the accompanying drawings to which, however, the scope of the invention is in no way limited.

Figure 1:
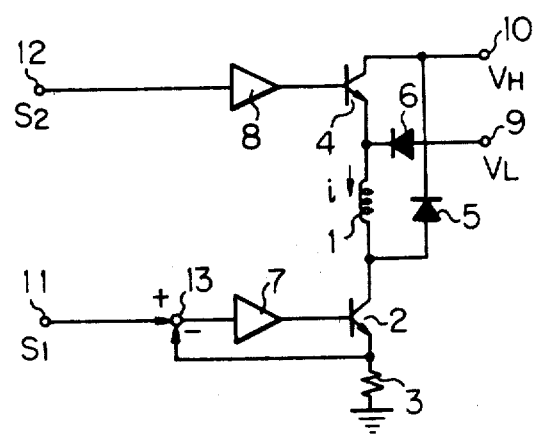
FIG. 1 is a schematic diagram of one phase of the circuit for driving a pulse motor according to the present invention.

Referring to FIG. 1 which shows the block diagram of the circuit for driving one phase of the pulse motor, 1 is a motor coil; 2 is a transistor, which controls the current in the motor coil; 3 is a resistor, which detects the current flowing in the transistor 2; 4 is a transistor for supplying a high voltage pulse to the motor coil; 5 and 6 are diodes; 7 and 8 are amplifiers; 9 is a terminal for supplying a low voltage source; 10 is a terminal for supplying a high voltage source; 11 is a low voltage command terminal, and; 12 is a high voltage command terminal.

Figure 2:
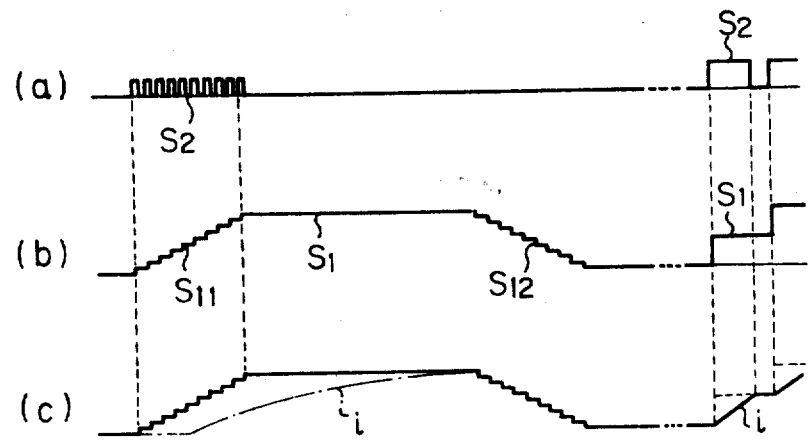
FIG. 2 is a series of signal waveforms at several points in the schematic diagram shown in FIG. 1.

Referring to the circuit shown in FIG. 1, when a trapezoidal waveform command signal $S_1$, as shown in (b) of FIG. 2, is supplied to the low voltage command terminal 11, the amplifier 7 turns the transistor 2 on and the current flows from the terminal 9 to ground, via the diode 6, the motor coil 1, the transistor 2, and the resistor 3. Therefore, the motor coil 1 is excited and the rotor (not shown in Figure) of the pulse motor steps. The current $i$ of the motor coil is fed back to an input of comparator 13 and is compared to the trapezoidal waveform command signal $S_1$. The difference between the current $i$ and the signal $S_1$ controls the conductivity of the transistor 2. Therefore, the waveform of the current $i$ coincides with that of the signal $S_1$.

However, when the revolution speed of the pulse motor increases, the waveform of the current $i$ is spoiled by the affect of the inductance of the motor coil and the current corresponding to the rising portions $S_{11}$ of the trapezoidal waveform command signal $S_1$ takes the form of the chain line shown in (c) of FIG. 2. The falling portions $S_{12}$ of the trapezoidal waveform command signal $S_1$ is not effected by the inductance of the motor coil 1, because the current flows in the circuit 9-6-1-5-10-9. When the rising portion of the current i is spoiled as shown by the chain line in (c) of FIG. 2, the torque of the motor decreases and the vibration of the motor increases.

For the purpose of improving this defect, according to the present invention, an input signal $S_2$, as shown in (a) of FIG. 2, is supplied to the high voltage command terminal 12 so as to coincide with the increasing portion $S_{11}$ of the trapezoidal waveform command signal $S_1$. The increasing portion $S_{11}$ of the trapezoidal waveform command signal $S_1$ has a staircase waveform and, in the embodiment shown in (b) of FIG. 2, is composed of ten steps. As shown in (a) of FIG. 2, the input signal $S_2$ is composed of ten pulses which are synchronized with the steps of the rising staircase portion as shown in the enlarged right portion of (a), (b) of FIG. 2. When the input signal $S_2$ is supplied to the terminal 12, the transistor 4 is turned on during the period corresponding to the pulse width of the signal $S_2$ and the high voltage $V_H$ is supplied to the motor coil via a circuit composed of 10-4-1-2-3. When the high voltage $V_H$ is supplied to the motor coil 1, the current $i$ in the motor coil rises sharply. When the input signal $S_2$ ceases, the transistor is turned off and the current $i$ is controlled by the trapezoidal waveform command signal and the low voltage source. Therefore, when each pulse width of the input signal $S_2$ is selected so that the increase of the current $i$ which is equal to that of one step of the rising portion $S_{11}$ is obtained, the waveform of the current $i$ in the motor coil can coincide with that of the trapezoidal waveform command current $S_1$ and the ideal trapezoidal wave form can be obtained.

Figure 3:
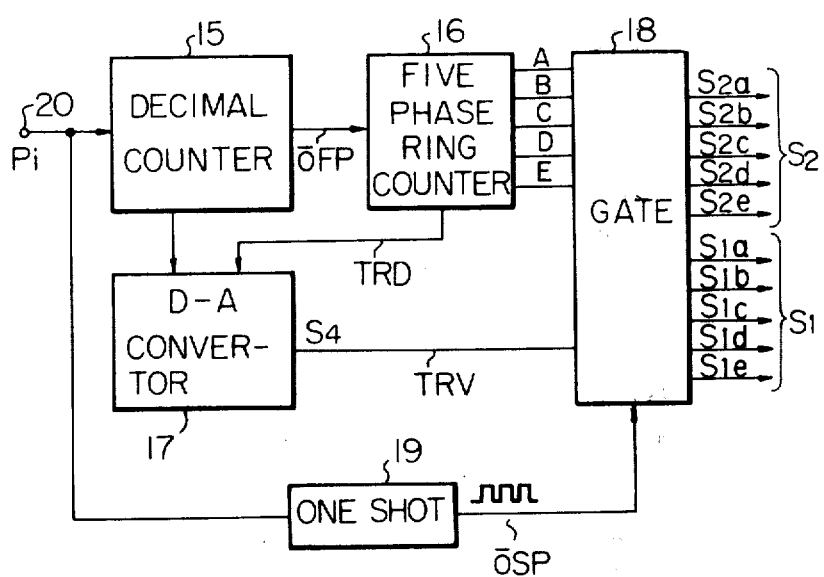
FIG. 3 is a block diagram of the command signal generator which supplies the command signal to the circuit shown in FIG. 1.

FIG. 3 is a circuit for generating the above-mentioned signals $S_1$ and $S_2$. Referring to FIG. 3, 15 is a decimal counter, 16 is a five phase ring counter, 17 is a D-A converter, 18 is a gate and 19 is a one shot multivibrator.

Figure 4:
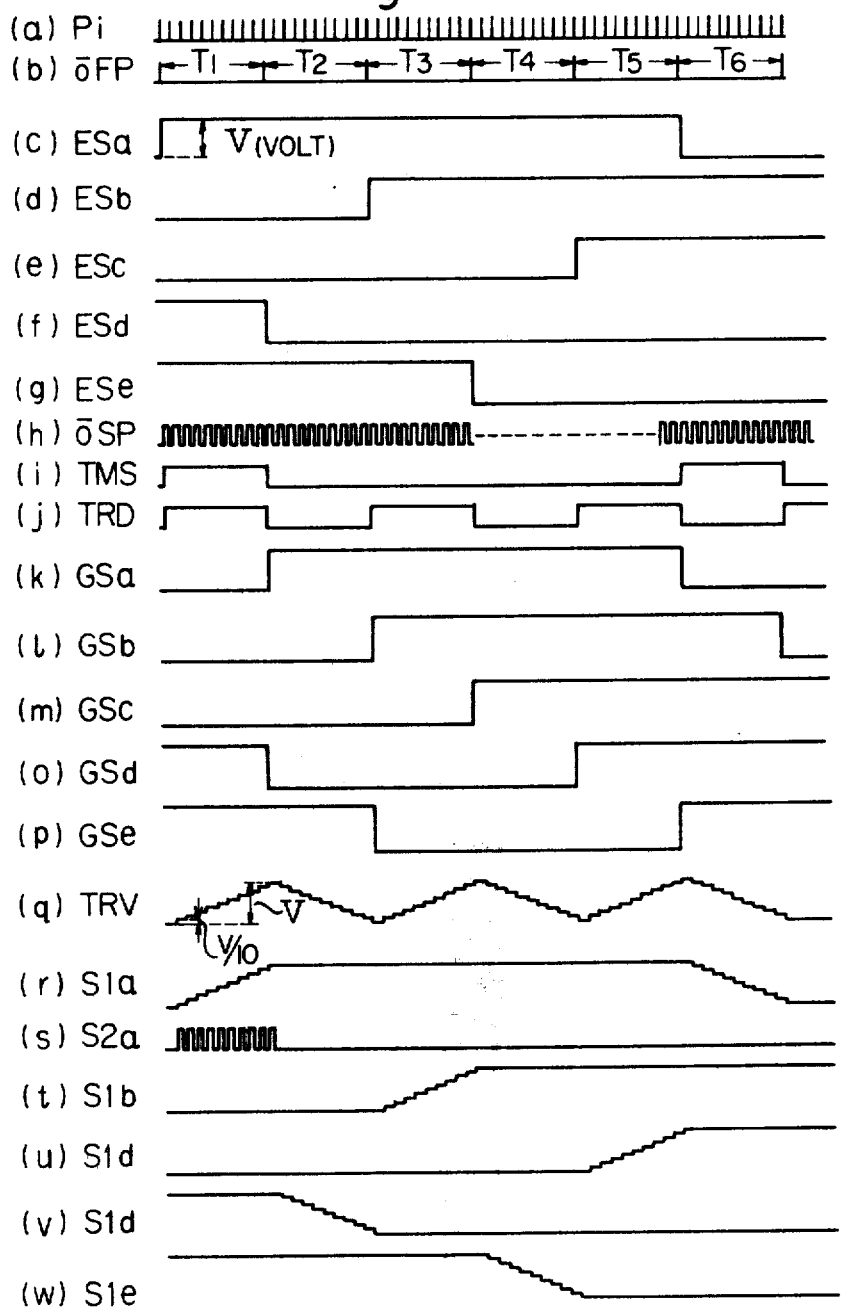
FIG. 4 is a series of signal waveforms at several points in the block diagram shown in FIG. 3.

Referring to FIG. 3, when a command pulse Pi, which corresponds to the amount of the displacement of 1 $\mu$ as shown (a) of FIG. 4, appears at an input terminal 20, the command pulse Pi is supplied to the decimal counter 15 and the frequency of the command pulse Pi is divided by ten as shown (b) of FIG. 4. This frequency divided pulse $\overline{OFP}$ is applied to the five phase ring counter 16. The five phase ring counter generates rectangular pulses ES$a$, ES$b$, ES$c$, ES$d$, ES$e$ ((c) through (g) of FIG. 4) which command two phase - three phase alternate excitation for the five phase pulse motor. the counted value of the decimal counter 15 is converted to an analog value by the D-A analog converter 17 as explained in detail hereinafter. That is, when the five phase ring counter 16 is in the three phase exciting condition, the converter 17 converts the counted value of the decimal counter 15 to the analog value which is proportional to the counted value. When the counter 16 is in the two phase exciting condition, the converter 17 converts the counted value to the analog value which is reversely proportional to the counted value. In the time chart of FIG. 4, the command pulses Pi which correspond to the first pulse through the tenth pulse appear at the time of the three phase exciting condition (the polarity of the pulses ES$a$, ES$d$ and ES$e$ is positive) and the counts of the decimal counter 15 are converted to an analog value proportional to themselves. The command pulses Pi, which correspond to the eleventh pulse through the twentieth pulse appear at the time of the two phase exciting condition (the polarity of the pulses ES$a$ and Es$e$ is positive) and the counts of the decimal counter 15 are converted to an analog value reversely proportional to themselves. Therefore, an output pulse TRV which has a rising staircase portion and a falling staircase portion, as shown in (q) of FIG. 4, can be obtained. The rising staircase portion and the falling staircase portion of the pulse TRV are added to the front and rear portions of the rectangular pulses ES$a$, ES$b$, ES$c$, ES$d$ and ES$e$ in the gate 18. Therefore, the gate 18 generates the trapezoidal waveform command signal $S_{1a}$, as shown in (r) of FIG. 4. For example, with respect to the phase A, the increasing portion and the decreasing portion of the pulse TRV are respectively added to the rising portion and the falling portion of the output ES$a$ of the ring counter, and the trapezoidal waveform signal $S_{1a}$ for phase A is obtained. The command pulses Pi also applied to the one-shot multivibrator 19 which converts the command pulses Pi to the pulse $\overline{OSP}$ having a predetermined pulse width and the pulse $\overline{OSP}$ is supplied to the gate 18 hereinafter described. The gate 18 generates the pulse signal $S_{2a}$, shown in (s) of FIG. 4, during the increasing portion of the command signal $S_{1a}$. For example, the pulse $S_{2a}$ is generated corresponding to the command pulse $S_{1a}$.

Figure 5:
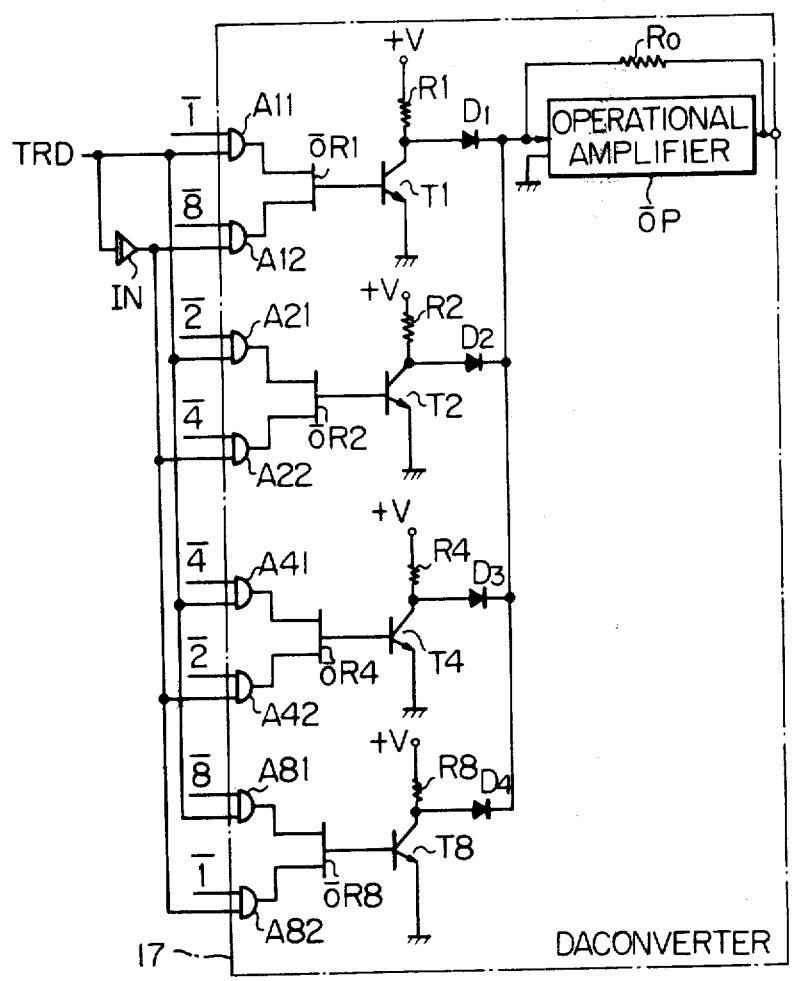
FIG. 5 is a schematic diagram of a digital analog converter as shown in FIG. 3.

FIG. 5 is a detailed circuit diagram of the digital-analog converter 17 shown in FIG. 3. Referring to FIG. 5, numbers $\overline{1}, \overline{2}, \overline{4}$ and $\overline{8}$ are the outputs of the decimal counter 15 and these outputs are obtained from each digit constituting the decimal counter 15 and are connected to the terminals of AND gates $A_{11}, A_{21}, A_{41}, A_{81}, A_{12}, A_{22}, A_{42}$ and $A_{82}$. For obtaining the output voltage as shown in FIG. 4 (r), it is necessary that the output of the digital-analog converter be composed of two portions. That is, a first portion, which increases gradually from zero value to a maximum level while the content of the decimal counter 15 is 1 through 10 at the three phase excitation; a second portion, which decreases gradually from the maximum level to zero level while the content of the counter 15 is 1 through 10 at the two phase excitation. Referring to FIG. 5, the input TRD, as shown in (j) of FIG. 4, is connected from the five phase ring counter 16, and in case of the three phase excitation, logic 1 is supplied from said ring counter 16, and in case of the two phase excitation, logic 0 is supplied from said ring counter 16. The input TRD is connected to the other inputs of the gates $A_{11}, A_{21}, A_{41}$ and $A_{81}$ and also via a NOT gate IN to the other input of the gates $A_{12}, A_{22}, A_{42}$ and $A_{82}$. The outputs of gates $A_{11}$ and $A_{12}$, $A_{21}$ and $A_{22}$, $A_{41}$ and $A_{42}$, and $A_{81}$ and $A_{82}$ are respectively connected to $\overline{OR}$ gates $\overline{OR}_1, \overline{OR}_2, \overline{OR}_4$ and $\overline{OR}_8$. The output of the $\overline{OR}$ gate $\overline{OR}_1$ is connected to a transistor $T_1$ whose emitter is grounded. The collector of the transistor $T_1$ is connected via a resistor $R_1$ to an electric source potential +V. The connection point of the collector of the transistor $T_1$ and the resistor $R_1$ is connected via a diode $D_1$ to the input of the operational amplifier OPA.

With respect to the outputs of the $\overline{OR}$ gate $\overline{OR}_2, \overline{OR}_4$ and $\overline{OR}_8$, connections similar to that of the output of the $\overline{OR}$ circuit $\overline{OR}_1$ are applied.

In the circuit shown in FIG. 5, the values of the resistors $R_1, R_2, R_4, R_8$ and $R_0$ which is a resistor of the operational amplifier $\overline{OP}$ have a proportion of 8 : 4 : 2 : 1 : 0.8.

Assuming that the three phase excitation signal TRD is 1, and that the content of the decimal counter 15 is 1, the output of $\overline{OR}$ gate $\overline{OR}_1$ becomes 0 and only the transistor $T_1$ is placed in the off condition, and the output voltage 0.1 V is obtained at the output terminal $S_1$ of the operational amplifier $\overline{OP}$. When the output of the decimal counter increases, the output of the digital-analog converter also increases stepwisely from 0.1 V to V (wherein V is the maximum value as shown in ($q$) of FIG. 4) in accordance with the increase of the content of the counter from 1 to 10.

Next, in case that three phase excitation signal TRD is 0, the output of the digital-analog converter decreases in accordance with the increase of the content of the decimal counter from 1 to 10. Therefore, the waveform shown in ($q$) of FIG. 4 can be obtained.

Figure 6:
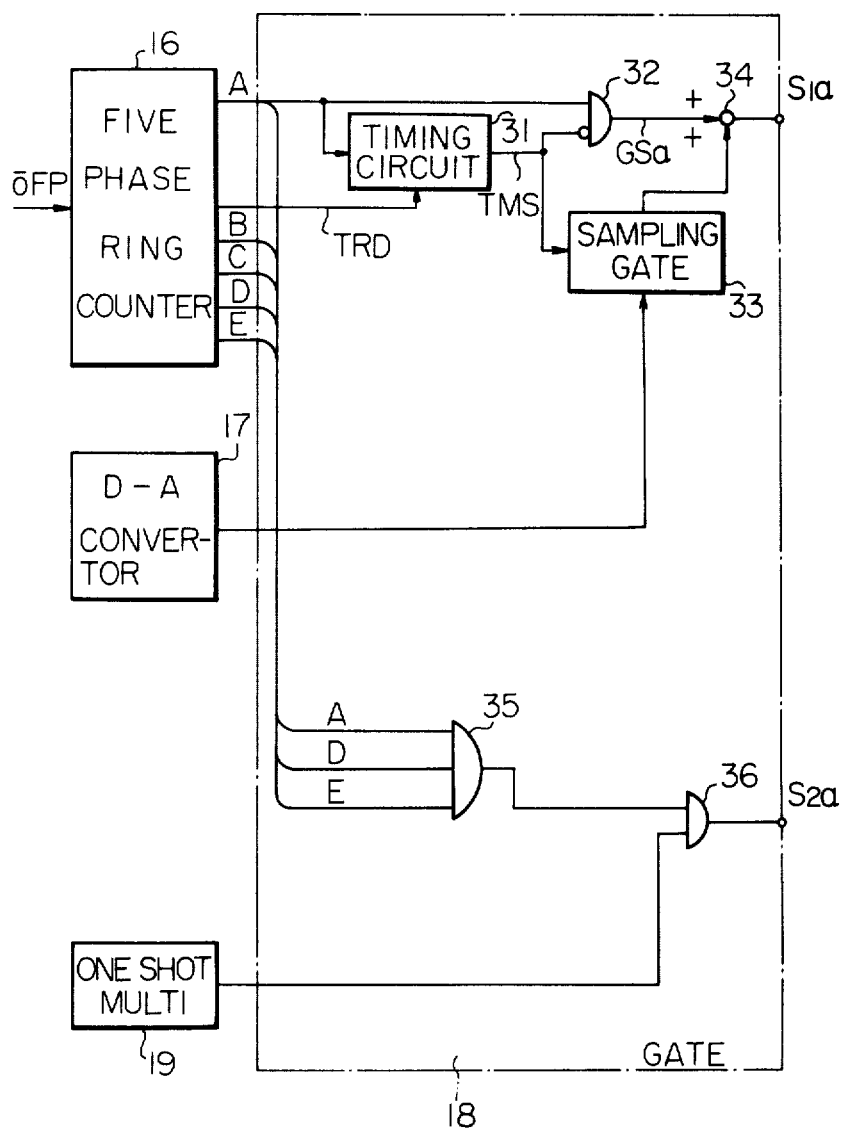
FIG. 6 is a block diagram of the gate circuit shown in FIG. 3.

FIG. 6 shows a block diagram of A-phase of the gate circuit 18 shown in FIG. 3. Referring to FIG. 6, the five phase ring counter 16 is a circuit which controls exciting phases in accordance with the pulses $\overline{OFP}$. That is, the five phase ring counter 16 generates rectangular pulses which select the phases to be excited. And connecting means A, B, C, D and E are provided for sending rectangular pulses ES$a$, ES$b$, ES$c$, ES$d$ and ES$e$. As shown in ($c$) through ($g$) of FIG. 4, these rectangular pulses ES$a$, ES$b$, ES$c$, ES$d$ and ES$e$ have phase differences corresponding to two periods of pulses $\overline{OFP}$. As is clear from ($a$) through ($g$) of FIG. 4, in the period $T_1$, the exciting coils of phases A, D and E are selected, in the period $T_2$, the exciting coils of phases A and E are selected, and in the period $T_3$, the exciting coils of phases A, B and E are selected. After this, a similar two phase-three phase alternate excitation is repeated each time a pulse $\overline{OFP}$ is received. Reference number 31 indicates a timing circuit which receives the rectangular waveform pulses ES$a$ and the three phase excitation signal TRD from the five phase ring counter 16 and generates the output TMS, shown as ($i$) of FIG. 4. Said output TMS has logic 1 only in the periods $T_1$ and $T_6$, which correspond to one period of the pulse $\overline{OFP}$ at the rise or fall portion of the rectangular waveform pulse ES$a$, and has logic 0 in other periods. This output signal is supplied to an inhibit input terminal of the inhibit gate 32 and one input terminal of the sampling gate 33 (see Millman and Taub: "Pulse, Digital and Switching Waveforms" pp 627 – 667, published by McGraw-Hill Book Company). Another input terminal of the inhibit gate 32 receives the rectangular waveform pulse ES$a$, therefore, the leading portion of said pulse ES$a$ is deleted over the period $T_1$ and the rectangular waveform pulse GS$a$, shown as ($k$) of FIG. 4 is obtained at the output terminal of the inhibit gate 32. The sampling gate 33 opens during the period $T_1$ and $T_6$, and sends out the rising portion which corresponds to the period $I_1$ of the triangular waveform pulse TRV and the falling portion which corresponds to the period $T_6$ of the triangular waveform pulse TRV. The analog adder 34 adds the output of the inhibit gate 32 and that of the sampling gate 33 and sends out the trapezoidal waveform pulse S1$a$, shown as ($r$) of FIG. 4. The timing circuit 31, inhibit gate 32, sampling gate 33 and analog adder 34 are provided for other phases B, C, D and E, and the rectangular waveform pulses GS$b$ through GS$e$, shown as ($l$) through ($p$) of FIG. 4 and the trapezoidal waveform pulses S1$b$ through S1$e$, shown as ($t$) through ($w$) of FIG. 4 are provided for other phases.

On the other hand, rectangular signals ES$a$, ES$d$ and ES$e$ are supplied from the five phase ring counter 16 to AND gate 35 and said gate 35 supplies the pulse signal having a pulse width corresponding to the period $T_1$ to one input of the AND gate 36. The output of the one shot multivibrator 19 is supplied to the other input of the AND gate 36. Thus, the output pulses S2$a$, as shown in ($s$) of FIG. 4, are obtained at the output of the gate circuit 24. FIG. 6 shows a block diagram of the gate circuit only for the phase A, however, a similar circuit is applied for each of the other phases B, C, D and E.

Figure 7A:
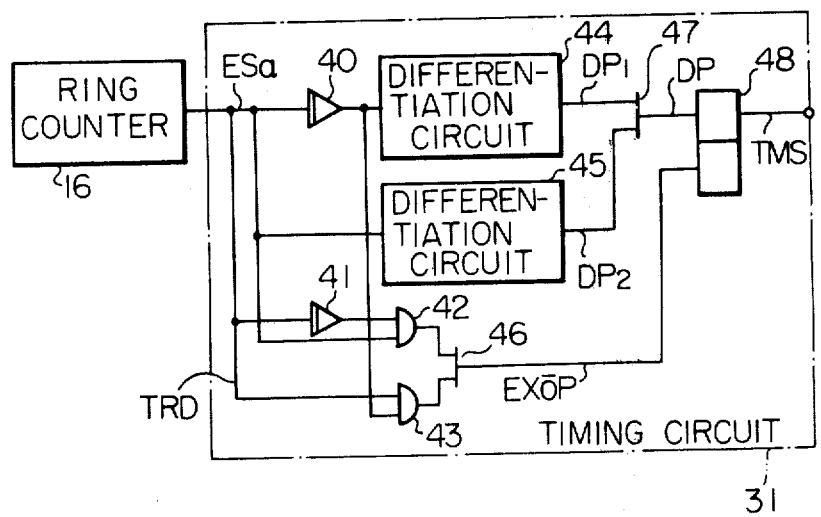
FIG. 7A is a block diagram of the timing circuit shown in FIG. 6.
Figure 7B:
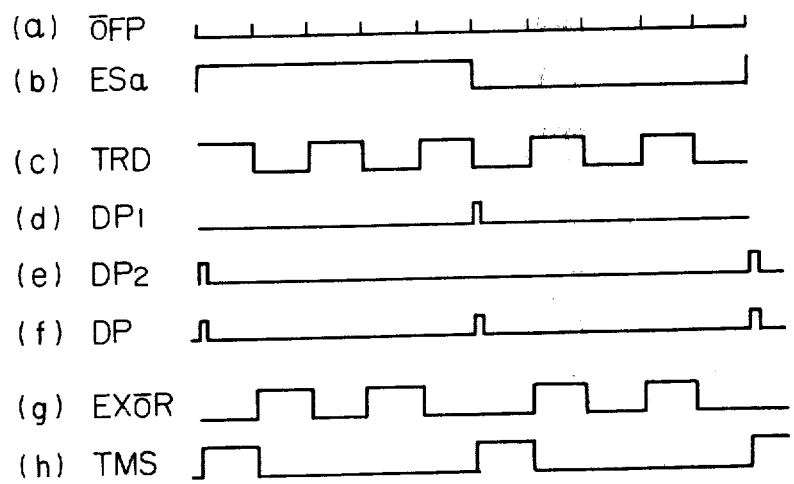
FIG. 7B is a series of signal waveforms at several points in the block diagram shown in FIG. 7A.

FIG. 7A shows a detailed circuit diagram of the timing circuit 31 and FIG. 7B shows waveforms in each part of the circuit shown in FIG. 7A. The circuit in FIG. 7A shows only phase A of the pulse motor, however, it is understood that similar circuits are provided with respect to other phases. Referring to FIG. 7A, reference numbers 40 and 41 show inverters, reference numbers 42 and 43 are AND gates, 46 and 47 are OR gates, 44 and 45 are differentiation circuits and 48 is a RS type flip-flop circuit. The differentiation circuit 45 generates a pulse DP$_2$ shown as ($e$) of FIG. 7B at a rising time of the A phase rectangular waveform pulse ES$a$, shown as ($b$) of FIG. 7B. The A phase rectangular waveform pulse ES$a$ is also applied via the inverter 40 to the differentiation circuit 44 where said pulse ES$a$ is differentiated and generates a pulse DP$_1$, shown as ($d$) of FIG. 7B. The outputs DP$_1$ and DP$_2$ of the differentiation circuits 44 and 45 are supplied to the input terminals of the OR gates 47 which generate pulse DP, shown as ($f$) of FIG. 7B. At the same time, inverters 40 and 41, AND gates 42 and 43, and OR gate 46 constitute the circuit which obtains an exclusive OR between the A phase rectangular waveform pulse ES$a$ and the three phase exciting signal TRD, and the exclusive OR signal EX$\overline{OR}$, shown as ($g$) of FIG. 7B, is produced at the output of the OR gate 46. The output signal DP of the OR gate 47 is applied to a set input terminal of the flip-flop circuit 48 and the exclusive OR signal EX$\overline{OR}$ is applied to a reset input terminal of the flip-flop circuit 48; therefore, the output signal TMS having a pulse width equal to one period of the pulse $\overline{OFP}$ appears, every fifth period of the pulses $\overline{OFP}$, at a set side output terminal of the flip-flop circuit 48.

What is claimed is:

1. A method for driving an electric multiphase pulse motor which is provided with an exciting coil corresponding to each phase of said motor and said motor revolves in response to trapezoidal waveform exciting signals, comprising the steps of:

generating a trapezoidal waveform exciting signal for each phase, said waveform having an increasing staircase portion of increment steps and a decreasing staircase portion of increment steps;

applying the trapezoidal waveform exciting signal for each phase to the respective exciting coils via respective linear amplifiers to produce exciting current in said respective exciting coils; and applying high voltage exciting pulses to said exciting coils during said increasing staircase portion of the respective waveforms, said high voltage exciting pulses being synchronized with the steps of said increasing staircase portion of said trapezoidal waveform exciting signals and having a desired pulse width for increasing the current corresponding to each increment step of said increasing staircase portion, thereby producing a trapezoidal waveform exciting current in each of said exciting coils.

2. A system for driving an electric pulse motor having $n$ exciting coils in a predetermined order and which moves in response to command pulses, comprising:

means for generating, in accordance with said command pulses, $n$ trapezoidal waveform exciting signals which have increasing staircase portions of increment steps and decreasing staircase portions of increment steps, said trapezoidal waveform exciting signals being generated in succession with a time difference which depends on the frequency of said command pulses, means for selectively applying said successive trapezoidal waveform exciting signals to respectively corresponding ones of said n exciting coils, thereby causing exciting current to flow in the corresponding exciting coils, means for generating high voltage excitation pulses in response to said command pulses and synchronized with the increments steps of said increasing staircase portion of said trapezoidal waveform, means for selectively applying said high voltage excitation pulses to said n exciting coils simultaneously with said increasing staircase portions of the respective waveforms, said high voltage excitation pulses having a desired pulse width for increasing said current corresponding to each increment step of said increasing staircase portion.

3. A system for driving an electric pulse motor according to claim 2, wherein said means for generating n trapezoidal waveform exciting signals comprises;

a counting means which counts said command pulses, said counting means generates control pulses and an output of the number of command pulses counted, each of said control pulses correspond to a predetermined number of command pulses, a five phase ring counter means receiving said control pulses and generating rectangular pulses which command the excitation for said pulse motor, a D-A converter means which receives the output count of said counting means and generates a trapezoidal pulse composed of a rising staircase portion and a falling staircase portion, a gate means for adding said rising staircase portion and falling staircase portion, respectively, to said rectangular pulses from said five phase ring counter.

4. A system for driving an electric pulse motor according to claim 2, wherein said means for generating said high voltage excitation pulses, comprises, a one shot multivibrator for converting said command pulses into pulses having a predetermined pulse width; and said means for applying said high voltage excitation pulses comprises:

a gate means for supplying said pulses of said one shot multivibrator to a corresponding one of said n exciting coils thereby causing high voltage excitation at said corresponding exciting coil.

* * * * *

UNITED STATES PATENT AND TRADEMARK OFFICE
CERTIFICATE OF CORRECTION

PATENT NO. : 3,919,608
DATED : November 11, 1975
INVENTOR(S) : Hiroshi Usami et al It is certified that error appears in the above-identified patent and that said Letters Patent are hereby corrected as shown below:

Column 5, line 7, "0" should be --"0"--.
Column 5, line 33, "1" should be --"1"--.
Column 5, line 36, "0" should be --"0"--.
Column 5, line 49, "$I_1$" should be --$T_1$--.

Signed and Sealed this twenty-fourth Day of February 1976

[SEAL]

Attest:

RUTH C. MASON
*Attesting Officer*

C. MARSHALL DANN
*Commissioner of Patents and Trademarks*